(No Model.)
G. B. GILREATH.
GATE.
No. 436,702. Patented Sept. 16, 1890.
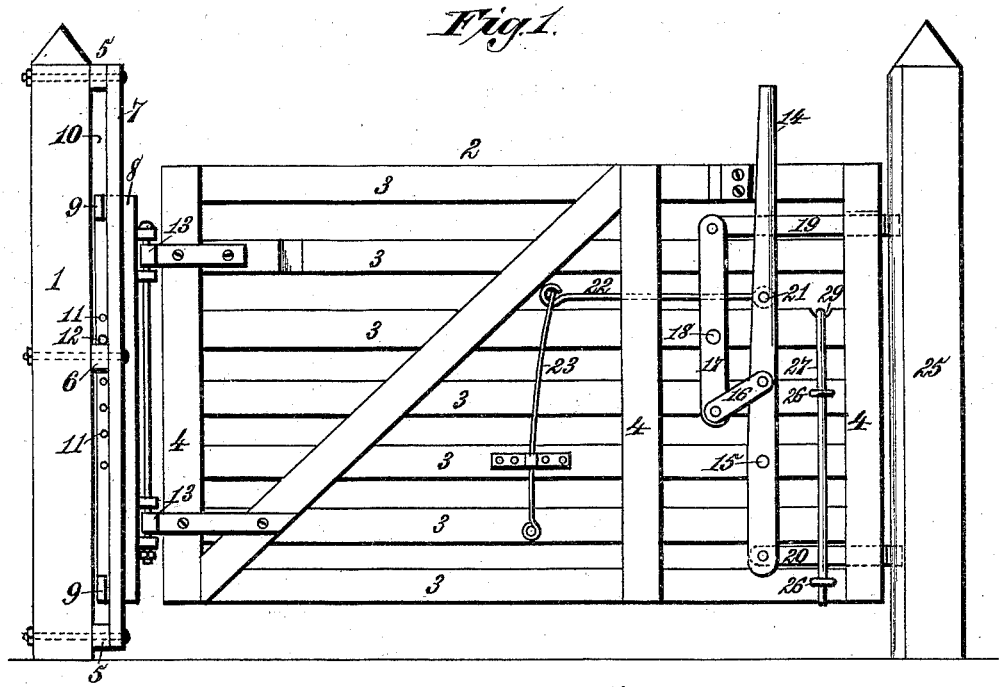
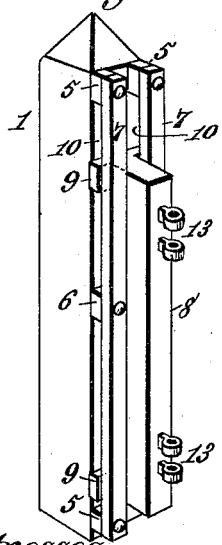
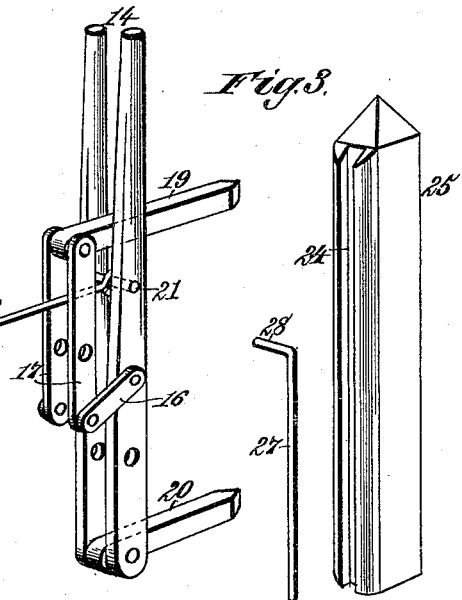
Witnesses:
Inventor:
George B. Gilreath,
By James L. Norris,
Atty.

UNITED STATES PATENT OFFICE.

GEORGE B. GILREATH, OF CIVIL BEND, MISSOURI.

GATE.

SPECIFICATION forming part of Letters Patent No. 436,702, dated September 16, 1890.

Application filed February 8, 1890. Serial No. 339,656. (No model.)

*To all whom it may concern:*

Be it known that I, GEORGE B. GILREATH, a citizen of the United States, residing at Civil Bend, in the county of Daviess and State of Missouri, have invented new and useful Improvements in Gates, of which the following is a specification.

My invention relates to that class of swinging gates which are capable of opening both inward and outward and are made vertically adjustable to clear obstructions on the ground— such as snow or ice—and to permit the passage of poultry and small animals beneath the closed gate.

The invention consists in the construction and combination of parts hereinafter described and claimed.

In the annexed drawings, illustrating the invention, Figure 1 is a view of a swinging vertically-adjustable gate embodying my improvements. Fig. 2 is a detail view showing the manner of connecting the hinged end of the gate with the main supporting-post. Fig. 3 is a detail view of the latch-post and latching mechanism, showing how the gate is engaged therewith.

Referring to the drawings, the numeral 1 designates the main supporting-post of the gate 2, which gate may consist of horizontal bars 3 and vertical braces 4, arranged in any ordinary or suitable manner.

The supporting-post 1 is provided on the gate side at the top and bottom with blocks 5 and at or near the center with blocks 6, to which blocks 5 and 6 the vertical and parallel guide-strips 7 are securely attached.

Between the opposite blocks 5 and 6 and the opposite parallel strips 7 is arranged a vertically-sliding bar 8, having metal crossheads 9, secured to its rear or inner sides near its ends and projecting laterally to engage in the spaces or slots 10 between the strips 7 and supporting-post.

The rear or inner portion of the vertically-sliding bar 8 is provided within the slots 10 on each side of the gate with a series of perforations 11, with either one of which may be engaged a pin 12, which will rest on the central blocks 6 and so support the gate at any height to which it may be raised or adjusted.

The gate 2 is attached to the vertically-sliding bar 8 by hinges 13, so arranged or centered as to enable the gate to be swung open freely in either direction.

To the opposite sides of one of the horizontal bars 3 near the latching end of the gate are pivoted two vertically-projecting hand-levers 14 on a common fulcrum 15, located a suitable distance above the ends of said levers. Each lever 14 is pivotally connected above the fulcrum to one end of a link 16, the other end of which is pivotally attached to the lower end of a lever 17, that is fulcrumed on the same side of the gate on a pin 18, supported in one of the horizontal bars 3, and which serves also as a fulcrum for the corresponding lever 17 on the opposite side of the gate. A horizontal movable upper latch 19 is attached to and between the upper ends of the levers 17, and a similar lower latch 20 is attached to and between the lower ends of the hand-levers 14, as shown.

The hand-levers 14 are connected above the links 16 by a bolt or pin 21, to which is attached the forward end of a rod 22, which connects at its other end with springs 23, that are mounted on the opposite sides of the gate. These springs 23 serve to hold the hand-levers 14 in a normally-vertical position, with the connected latches 19 and 20 projected into a vertical slot or groove 24 in the adjacent surface of the latching-post 25 when the gate is closed. It is apparent that the hand-levers 14 and their latching connections are all adapted to be moved together, and that by pressing the upper end of either of said hand-levers toward the latching-post 25 the latches 19 and 20 will be simultaneously moved back from engagement with the groove 24 in said post and so permit the gate to be swung open in either direction.

By providing two latches 19 and 20, as described, the gate, when closed, is securely fastened at top and bottom, the hand-levers 14 being held in a vertical position by the springs 23, so as to retain the latches in engagement with the latching-post 25 until the hand-levers are forced toward said post when it is desired to open the gate.

Near the latching end of the gate on one side are staples 26, in which is arranged a vertically-movable rod 27, having a laterally-projecting arm 28 on its upper end, by which it is normally supported by engaging said arm in a notch 29, formed in one of the horizontal gate-bars. When the gate is opened, this rod 27 can be lowered and thrust into the ground to prevent the gate from closing.

Whenever it is desired to adjust the gate vertically, the pin 12, resting on the blocks 6, can be withdrawn and reinserted in another one of the series of perforations 11 after the gate has been raised or lowered, as required.

It will be observed that the gate is so constructed and arranged that its latching devices will readily engage with the latching-post whether the gate is adjusted to an elevated or a lowered position.

What I claim as my invention is—

1. In a gate, the combination, with the main supporting-post 1, provided with blocks or projections 5 and 6 and the parallel guide-strips 7, secured thereto, of the vertically-sliding bar 8, having perforations 11 and provided with cross-heads 9, engaged in the slots 10 between said guides and the post, and a pin 12, engaged in one of said perforations above the block 6, substantially as described.

2. In a gate, the combination of the hand-levers 14, the links 16, the levers 17, the upper horizontally-movable latch attached to the upper ends of the levers 17, the lower horizontally-movable latch 20, attached to the lower ends of the levers 14, the rod 22, the springs 23, and a latching-post provided with a groove 24 to engage said latches, substantially as described.

3. The combination of the main post 1, having parallel vertical guide-strips 7, the vertically-sliding bar 8, supported between said guides and provided with a series of perforations 11, the gate hinged to said vertically-sliding bar, the pin 12 for supporting said bar and gate in a raised position, the latching-post 25, having a vertical groove 24, and a double-lever-actuated latching mechanism supported by the gate and engaging said groove, substantially as described.

In testimony whereof I have affixed my signature in presence of two witnesses.

GEO. B. GILREATH.

Witnesses:
 GEORGE CLAPPER,
 SAMUEL T. BROSIUS.